United States Patent
Shen et al.

(10) Patent No.: US 10,324,989 B2
(45) Date of Patent: Jun. 18, 2019

(54) MICROBLOG-BASED EVENT CONTEXT ACQUIRING METHOD AND SYSTEM

(71) Applicant: Baidu Online Network Technology (Beijing) Co., Ltd., Beijing (CN)

(72) Inventors: Jianping Shen, Beijing (CN); Yang Mo, Beijing (CN); Xuan Li, Beijing (CN); Limei Che, Beijing (CN); Chuyu Zheng, Beijing (CN); Qinfang Qi, Beijing (CN); Yuanfeng Song, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 397 days.

(21) Appl. No.: 14/954,720

(22) Filed: Nov. 30, 2015

(65) Prior Publication Data
US 2016/0364488 A1 Dec. 15, 2016

(30) Foreign Application Priority Data

Jun. 12, 2015 (CN) .......................... 2015 1 0324990

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/2477* (2019.01); *G06F 16/285* (2019.01);
(Continued)

(58) Field of Classification Search
CPC ........ G06F 17/30867; G06F 17/30551; G06F 17/30598
See application file for complete search history.

(56) References Cited

U.S. PATENT DOCUMENTS

| 2014/0215005 A1* | 7/2014 | de Vos | ................... | H04L 67/02 709/217 |
| 2014/0372884 A1* | 12/2014 | Reponen | .............. | G09B 29/007 715/704 |
| 2016/0203225 A1* | 7/2016 | Alonso | ............. | G06F 17/30867 707/738 |

FOREIGN PATENT DOCUMENTS

| CN | 102012917 | 4/2011 |
| CN | 103324718 | 9/2013 |

(Continued)

*Primary Examiner* — Grace Park
(74) *Attorney, Agent, or Firm* — Knobbe Martens Olson & Bear LLP

(57) ABSTRACT

A Microblog-based event context acquiring method has: an event-related acquiring information of original microblogs and reposted microblogs thereof contained in a predetermined topic within a statistical time period; calculating an event heat time distribution about the topic corresponding to the information of the original and reposted microblogs thereof related to the event within the statistical time period, the event heat indicating a degree of concern of the original microblogs and the reposted microblogs thereof related to the event in a user group; and selecting, from the statistical time period, a plurality of event context time nodes and corresponding node events according to the event heat time distribution about the topic within the statistical time period so as to constitute an event context of the topic. Event context of the event contained in the predetermined topic by means of the microblogs is acquired quickly and accurately.

21 Claims, 5 Drawing Sheets

(51) Int. Cl.
*G06F 16/28* (2019.01)
*G06F 16/2458* (2019.01)
*H04L 12/58* (2006.01)
*G06Q 50/00* (2012.01)

(52) U.S. Cl.
CPC ............. *G06Q 50/01* (2013.01); *H04L 51/16* (2013.01); *H04L 51/32* (2013.01)

(56) References Cited

FOREIGN PATENT DOCUMENTS

| | | |
|---|---|---|
| CN | 103631862 | 3/2014 |
| CN | 104536956 | 4/2015 |

\* cited by examiner

US 10,324,989 B2

MICROBLOG-BASED EVENT CONTEXT ACQUIRING METHOD AND SYSTEM

CROSS REFERENCE TO RELATED APPLICATION

The present application claims priority and benefits of Chinese Patent Application No. 201510324990.9, filed on Jun. 12, 2015, the entirety of which is incorporated herein by reference.

TECHNICAL FIELD

The present invention relates to information processing technology, and in particular, to a microblog-based event context acquiring method and system.

BACKGROUND ART

Microblog has become the most common kind of casual interaction of Internet users, and meanwhile microblog is also an effective tool having obvious media properties for the users to understand news events and spread the news events. A collection constituted by events contained in the same topic is usually referred to as a topic, and a topic is usually made up of a plurality of event progresses. For example, the topic "Diaoyu Islands Dispute" includes a plurality of events such as "Japan purchases the Islands", "Hong Kong protects the Islands". Events in any topic include a process of generation, development, upsurge, and end, and the events occurring on key time nodes throughout the whole process are connected in series to form an event context about the progress of the topic. The event context is a critical way to get aware of the development of a news topic event. Hence, how to acquire the event context of a certain topic event based on the microblog poses a new challenge for the technicians in the art.

SUMMARY

Embodiments of the present invention provide a microblog-based event context acquiring method and system, which realize fast and accurate acquisition of an event context of an event contained in a predetermined topic by means of a microblog.

To achieve the above objective, the embodiments of the present invention provide a microblog-based event context acquiring method, including: acquiring information of original microblogs and reposted microblogs thereof related to an event contained in a predetermined topic within a statistical time period; calculating an event heat time distribution about the topic corresponding to the information of the original microblogs and the reposted microblogs thereof related to the event within the statistical time period, the event heat indicating a degree of concern of the original microblogs and the reposted microblogs thereof related to the event in a user group; and selecting, from the statistical time period, a plurality of event context time nodes and corresponding node events according to the event heat time distribution about the topic within the statistical time period so as to constitute an event context of the topic.

Further, the information of the original microblogs and the reposted microblogs thereof may comprise: a comment count, a repost count, and a praise count of the original microblogs and the reposted microblogs thereof.

Calculating an event heat time distribution about the topic corresponding to the information of the original microblogs and the reposted microblogs thereof related to the event within the statistical time period may comprise: calculating a first event heat time distribution about the topic within the statistical time period according to the comment count, the repost count, and the praise count of all the original microblogs and reposted microblogs thereof related to the event contained in the topic, the first event heat being a sum of the event heat corresponding to all target events.

Further, calculating a first event heat time distribution about the topic within the statistical time period according to the comment count, the repost count, and the praise count of all the original microblogs and reposted microblogs thereof related to the event contained in the topic may comprise: setting a weight coefficient for each of the comment count, the repost count, and the praise count of all the original microblogs and reposted microblogs thereof related to the event contained in the topic; summing up products obtained by multiplying each of the comment count, the repost count, and the praise count of all newly generated original microblogs and reposted microblogs thereof related to the event corresponding to each time node within the statistical time period with respective weight coefficient as the first event heat on the corresponding time node; and forming the first event heat time distribution according to the first event heat corresponding to each time node within the statistical time period.

Further, selecting, from the statistical time period, a plurality of event context time nodes according to the event heat time distribution about the topic within the statistical time period may comprise: selecting, from the statistical time period, a plurality of time nodes representing a steep increase of the first event heat in the first event heat time distribution according to the first event heat time distribution about the topic within the statistical time period; and determining an earliest time node from the time nodes representing the steep increase of the first event heat in the first event heat time distribution as a context time node of an initial event.

Further, selecting, from the statistical time period, a plurality of time nodes representing a steep increase of the first event heat in the first event heat time distribution according to the first event heat time distribution about the topic within the statistical time period may comprise: calculating, for the first event heat time distribution corresponding to the topic within the statistical time period, a steep increase amount of the first event heat corresponding to each time node within the statistical time period by using a calculation window containing multiple time nodes and taking one time node as a slide window to form a steep increase amount sequence of the first event heat; and determining the time nodes corresponding to the first event heat that is greater than a first threshold value in the steep increase amount sequence of the first event heat as the time nodes representing the steep increase of the first event heat.

Optionally, the first threshold value is obtained through the following process: calculating an average value and a standard difference of the steep increase amount sequence of the first event heat, and configuring corresponding weight coefficients thereof; and determining a sum of products obtained by multiplying the average value and the standard difference of the steep increase amount sequence of the first event heat with respective weight coefficient as the first threshold value.

Further, calculating an event heat time distribution about the topic corresponding to the information of the original microblogs and the reposted microblogs thereof related to the event within the statistical time period may comprise:

calculating a second event heat time distribution about the topic within the statistical time period according to the comment count, the repost count, and the praise count of all the original microblogs and reposted microblogs thereof, after the context time node of the initial event, related to the event contained in the topic within the statistical time period, the second event heat being a weighted sum of the event heat after weight coefficients are set for the original microblogs and reposted microblogs thereof corresponding to all the target events respectively.

Calculating a second event heat time distribution about the topic within the statistical time period according to the comment count, the repost count, and the praise count of all the original microblogs and reposted microblogs thereof, after the context time node of the initial event, related to the event contained in the topic within the statistical time period may comprise: setting a weight coefficient for each of the comment count, the repost count, and the praise count of all the newly generated original microblogs and reposted microblogs thereof, after the context time node of the initial event, related to the event contained in the topic within the statistical time period; for all original microblogs generated after the context time node of the initial event and reposted microblogs thereof related to the event contained in the topic within the statistical time period, multiplying the comment count, repost count, and praise count generated on each time node after the context time node of the initial event with respective weight coefficient, and then summing up the multiplying products corresponding to all the original microblogs to obtain the event heat of the original microblogs corresponding to the time node; summing up the multiplying products corresponding to all the reposted microblogs to obtain the event heat of the reposted microblogs corresponding to the time node; setting a corresponding weight coefficient for the event heat of the original microblogs and the event heat of the reposted microblogs respectively; summing up the products obtained by multiplying the event heat of the original microblogs and the event heat of the reposted microblogs corresponding to each time node after the context time node of the initial event with respective weight coefficient as the second event heat on the corresponding time node; and forming the second event heat time distribution according to the second event heat corresponding to each time node after the context time node of the initial event within the statistical time period.

Further, selecting, from the statistical time period, a plurality of event context time nodes according to the event heat time distribution about the topic within the statistical time period may comprise: selecting, from the statistical time period, a plurality of time nodes representing generation of new events in the second event heat time distribution according to the second event heat time distribution about the topic within the statistical time period; and determining the time nodes representing generation of new events in the second event heat time distribution as the context time nodes of a development event.

Further, selecting, from the statistical time period, a plurality of time nodes representing generation of new events in the second event heat time distribution according to the second event heat time distribution about the topic within the statistical time period may comprise: making statistics on the second event heat time distribution corresponding to events contained in another topic after the context time node of the initial event within the statistical time period; for the second event heat time distributions corresponding to the topic and another topic, calculating Chi-square statistics of a ratio of the second heat between the topic and the another topic corresponding to each two adjacent time nodes on the second event heat time distribution by using two adjacent calculation windows containing the same time node and taking one time node as the slide window, as the Chi-square statistic corresponding to the first time node of the time nodes in the latter calculation window; and determining the time node corresponding to the Chi-square statistic greater than a second threshold value from the Chi-square statistics as one of the time nodes representing generation of new events.

Further, selecting, from the statistical time period, the events corresponding to a plurality of event context time nodes according to the event heat time distribution about the topic within the statistical time period may comprise: evaluating a comprehensive score on the event heat and microblog quality of the original microblogs related to a newly added event contained in the topic corresponding to the acquired context time node of the initial event and the context time nodes of a plurality of development events corresponding to the topic, and selecting the event corresponding to the original microblog having the highest comprehensive score as a node event corresponding to the corresponding context time node.

The embodiments of the present invention further provides a microblog-based event context acquiring system, including: an information acquiring module, configured to acquire information of original microblogs and reposted microblogs thereof related to an event contained in a predetermined topic within a statistical time period; an event heat calculating module, configured to calculate an event heat time distribution about the topic corresponding to the information of the original microblogs and the reposted microblogs thereof related to the event within the statistical time period, the event heat indicating a degree of concern of the original microblogs and the reposted microblogs thereof related to the event in a user group; and an event context generating module, configured to select, from the statistical time period, a plurality of event context time nodes and corresponding node events according to the event heat time distribution about the topic within the statistical time period so as to constitute an event context of the topic.

Further, the information of the original microblogs and the reposted microblogs thereof may comprise: a comment count, a repost count, and a praise count of the original microblogs and the reposted microblogs thereof.

The event heat calculating module is configured to calculate a first event heat time distribution about the topic within the statistical time period according to the comment count, the repost count, and the praise count of all the original microblogs and reposted microblogs thereof related to the event contained in the topic, the first event heat being a sum of the event heat corresponding to all target events.

Further, the event heat calculating module may comprise: a first weight coefficient setting unit, configured to set a weight coefficient for each of the comment count, the repost count, and the praise count of all the original microblogs and reposted microblogs thereof related to the event contained in the topic; a first event heat generating unit, configured to sum up products obtained by multiplying each of the comment count, the repost count, and the praise count of all newly generated original microblogs and reposted microblogs thereof related to the event corresponding to each time node within the statistical time period with respective weight coefficient as the first event heat on the corresponding time node; and a first event heat distributing unit, configured to form the first event heat time distribution according to the first event heat corresponding to each time node within the statistical time period.

Further, the event context generating module may comprise: a heat steep increase selecting unit, configured to select, from the statistical time period, a plurality of time nodes representing a steep increase of the first event heat in the first event heat time distribution according to the first event heat time distribution about the topic within the statistical time period; and an initial event node unit, configured to determine an earliest time node from the time nodes representing the steep increase of the first event heat in the first event heat time distribution as a context time node of an initial event.

Further, the heat steep increase selecting unit may be configured to: calculate, for the first event heat time distribution corresponding to the topic within the statistical time period, a steep increase amount of the first event heat corresponding to each time node within the statistical time period by using a calculation window containing multiple time nodes and taking one time node as a slide window to form a steep increase amount sequence of the first event heat; and determine the time nodes corresponding to the first event heat that is greater than a first threshold value in the steep increase amount sequence of the first event heat as the time nodes representing the steep increase of the first event heat.

Optionally, the system further may comprise a first threshold value acquiring module, configured to: calculate an average value and a standard difference of the steep increase amount sequence of the first event heat, and configure corresponding weight coefficients thereof; and determine a sum of products obtained by multiplying the average value and the standard difference of the steep increase amount sequence of the first event heat with respective weight coefficient as the first threshold value.

Further, the event heat calculating module may be further configured to: calculate a second event heat time distribution about the topic within the statistical time period according to the comment count, the repost count, and the praise count of all the original microblogs and reposted microblogs thereof, after the context time node of the initial event, related to the event contained in the topic within the statistical time period, the second event heat being a weighted sum of the event heat after weight coefficients are set for the original microblogs and reposted microblogs thereof corresponding to all the target events respectively.

The event heat calculating module further may comprise: a second weight coefficient setting unit, configured to set a weight coefficient for each of the comment count, the repost count, and the praise count of all the newly generated original microblogs and reposted microblogs thereof, after the context time node of the initial event, related to the event contained in the topic within the statistical time period; an original microblog heat generating unit, configured to, for all original microblogs generated after the context time node of the initial event related to the event contained in the topic within the statistical time period, multiply the comment count, repost count, and praise count generated on each time node after the context time node of the initial event with respective weight coefficient, and then summing up the multiplying products corresponding to all the original microblogs to obtain the event heat of the original microblogs corresponding to the time node; a reposted microblog heat generating unit, configured to, for all reposted microblogs of the original microblogs generated after the context time node of the initial event related to the event contained in the topic within the statistical time period, multiply the comment count, repost count, and praise count generated on each time node after the context time node of the initial event with respective weight coefficient, and then summing up the multiplying products corresponding to all the reposted microblogs to obtain the event heat of the reposted microblogs corresponding to the time node; a third weight coefficient setting unit, configured to set a corresponding weight coefficient for the event heat of the original microblogs and the event heat of the reposted microblogs respectively; a second event heat generating unit, configured to sum up products obtained by multiplying the event heat of the original microblogs and the event heat of the reposted microblogs corresponding to each time node after the context time node of the initial event with respective weight coefficient as the second event heat on the corresponding time node; and a second event heat distributing unit, configured to form the second event heat time distribution according to the second event heat corresponding to each time node after the context time node of the initial event within the statistical time period.

Further, the event context generating module further may comprise: a new event selecting unit, configured to select, from the statistical time period, a plurality of time nodes representing generation of new events in the second event heat time distribution according to the second event heat time distribution about the topic within the statistical time period; and a development event node unit, configured to determine the time nodes representing generation of new events in the second event heat time distribution as the context time nodes of a development event.

Further, the new event selecting unit may be configured to: make statistics on the second event heat time distribution corresponding to events contained in another topic after the context time node of the initial event within the statistical time period; for the second event heat time distributions corresponding to the topic and another topic, calculate Chi-square statistics of a ratio of the second heat between the topic and the another topic corresponding to each two adjacent time nodes on the second event heat time distribution by using two adjacent calculation windows containing the same time node and taking one time node as the slide window, as the Chi-square statistic corresponding to the first time node of the time nodes in the latter calculation window; and determine the time node corresponding to the Chi-square statistic greater than a second threshold value from the Chi-square statistics as one of the time nodes representing generation of new events.

Further, the event context generating module may be further configured to: evaluate a comprehensive score on the event heat and microblog quality of the original microblogs related to a newly added event contained in the topic corresponding to the acquired context time node of the initial event and the context time nodes of a plurality of development events corresponding to the topic, and select the event corresponding to the original microblog having the highest comprehensive score as a node event corresponding to the corresponding context time node.

According to the microblog-based event context acquiring method and system provided in the embodiments of the present invention, the degrees of concern, in the user group, of the original microblogs and the reposted microblogs thereof related to the event contained in the predetermined topic are analyzed to form the event heat time distribution about the topic, and then a plurality of event context nodes and corresponding node events are selected to constitute the event context about the topic by using the distribution characteristics of the event heat time distribution.

DETAILED DESCRIPTION

A basic inventive concept of an embodiment of the present invention is to make statistics on the information of original microblogs of an event contained in a predetermined topic and reposted microblogs thereof by using a degree of concern of a microblog in the user group; form an event heat time distribution of the topic to reflect the degree of concern of the users on the event contained in the topic; and then analyze the event heat time distribution to acquire an event context time node that can represent a development context of the topic and the corresponding event on the time node, so as to form an entire event context of the topic.

Embodiment 1

Figure 1:
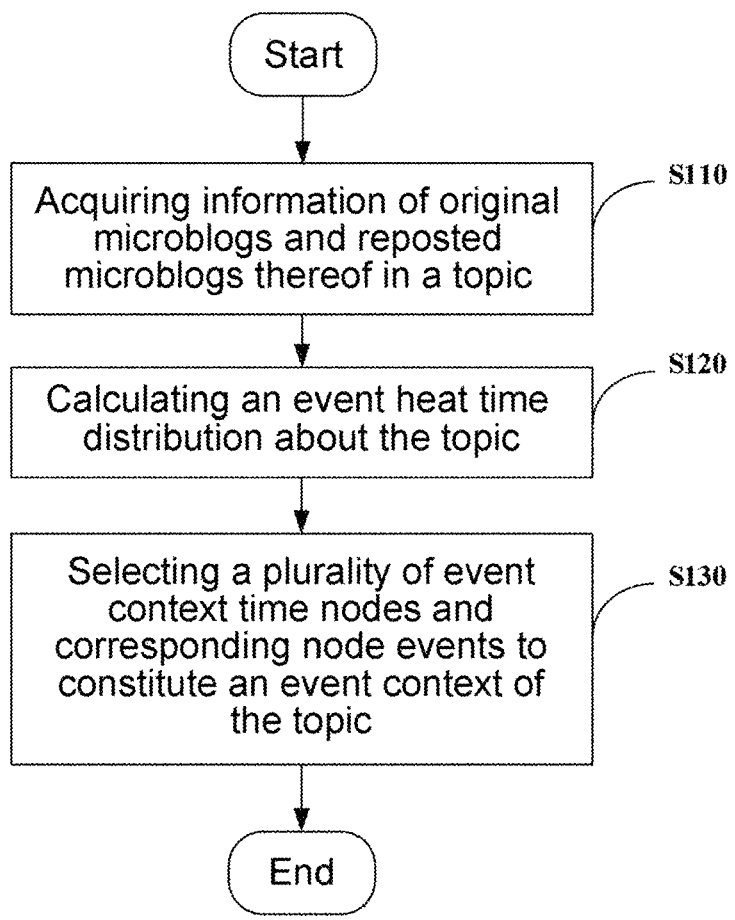
FIG. 1 is a flow chart of an embodiment of a microblog-based event context acquiring method according to an embodiment of the present invention.

FIG. 1 is a flow chart of an embodiment of a microblog-based event context acquiring method according to an embodiment of the present invention.

With reference to FIG. 1, in step S110, information of original microblogs and reposted microblogs thereof related to an event contained in a predetermined topic within a statistical time period is acquired.

In this embodiment, for studying a development context of an event contained in a certain predetermined topic within a fixed time period, the fixed time period is taken as a statistical time period, and the information of the original microblogs and the reposted microblogs thereof related to all the events contained in the topic within the statistical time period is acquired.

Specifically, when the information of the original microblogs of the event and the reposted microblogs thereof is acquired, the originally created microblog on a target event is taken as the original microblog, and the microblog directly or indirectly reposting the original microblog is referred to as the reposted microblog (a label of "reposted" is contained in the title of the reposted microblog). In general, a plurality of original microblogs (microblogs posted by a plurality of original bloggers) may be provided correspondingly related to the same event, and each of the original microblogs can be reposted many times to form reposted microblogs. In this embodiment, summarization and statistics may be made on the original microblogs and the reposted microblogs related to each target event, so as to extract the information of the original microblogs of the event, wherein each original microblog may carry a list of reposted microblogs containing the information of each reposted microblog corresponding to the original microblog. The information includes microblog release time and content, as well as the information of other users' operations on the microblog such as: comment, repost, praise, and other operations.

In step S120, an event heat time distribution about the topic corresponding to the information of the original microblogs of the event and the reposted microblogs thereof within the statistical time period is calculated, wherein the event heat indicates a degree of concern of the original microblogs and the reposted microblogs thereof related to the event in a user group.

The acquired information of the original microblogs and the reposted microblog thereof related to the event contained in the above predetermined topic is analyzed, to obtain the degree of concern of the users on the corresponding event, as represented by the users' operations performed on the microblogs related to these events, such as posting the original microblogs, reposting the original microblogs, and clicking to comment, repost, and praise the original microblogs and the reposted microblogs. Afterwards, statistics of time distribution are made on the degree of concern of the users on the corresponding event of the topic within the statistical time period, to obtain an event heat time distribution of the topic. In the event heat time distribution, the event heat value on each time node reflects the degree of concern of the users on the time node about the related event contained in the topic.

In step S130, a plurality of event context time nodes and corresponding node events are selected from the statistical time period to constitute an event context of the topic according to an event heat time distribution about the topic within the statistical time period.

In general, when a new event or an event progress is presented in the event contained in the topic, the users may pay a relatively concentrated attention on the original microblogs and the reposted microblogs related to the event. The concentrated attention is reflected correspondingly, in the event heat time distribution, as the occurrence of a steep increase of the heat in the event heat which changes with time. By means of this feature, the time node where the steep increase of the heat occurs in the above event heat time distribution is analyzed, and the time node that can best represent the event progress is selected as the event context time node in respect of the topic within the above statistical time period. Then, the node event that most likely serves as the event progress corresponding to the event context time node is selected from each related event as a corresponding context event, which is combined with the corresponding event context time node together to form the event context of the topic.

Of course, those skilled in the art may also take advantage of the feature of other changes of the event heat reflected in the above event heat time distribution when a new event or an event progress is presented in the event contained in the topic, to select from the event heat time distribution the event context time node and the corresponding node event thereof within the statistical time period to constitute the event context of the topic. None of these methods departs from the inventive concept of extracting the event context time node of the topic and the corresponding events through the change of degree of concern on the microblogs of the related event in this embodiment, thereby no longer possessing the inventiveness.

It is noted herein that, the time node in this embodiment and the follow-up embodiments can be regarded as a corresponding minimum time length statistical unit in the above statistical time period, i.e., a unit statistical time length, such as 1 day.

According to the microblog-based event context acquiring method provided in the embodiments of the present invention, the degrees of concern, in the user group, of the original microblogs and the reposted microblogs thereof related to the event contained in the predetermined topic are acquired by analysis, to form the event heat time distribution about the topic, and then a plurality of event context time nodes and corresponding node events are selected by using the distribution characteristics of the event heat time distribution to constitute the event context about the topic. The method in this embodiment can acquire the event context of the predetermined topic within the statistical time period quickly and accurately.

Embodiment 2

Figure 2:
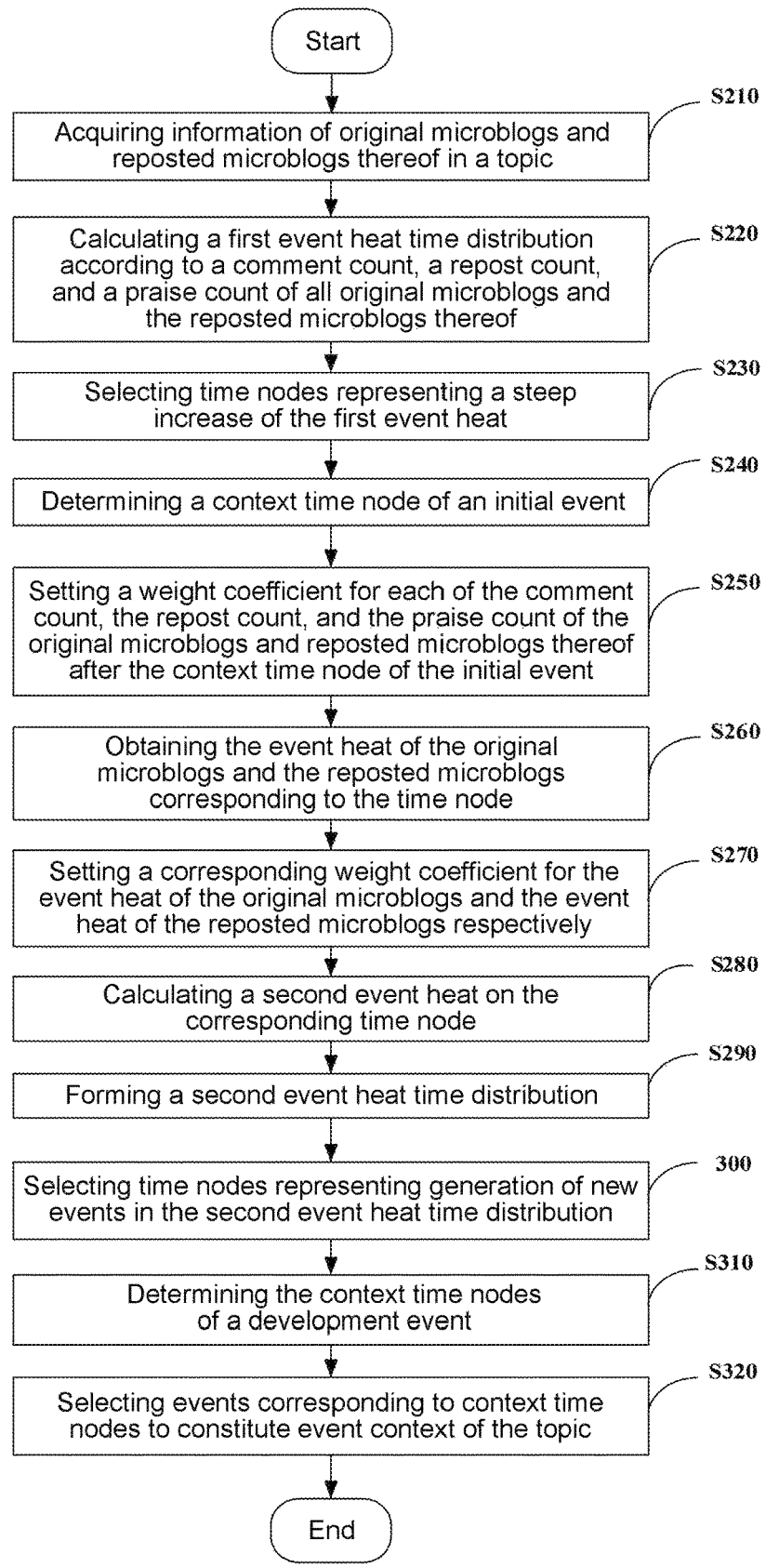
FIG. 2 is a flow chart of another embodiment of the microblog-based event context acquiring method according to an embodiment of the present invention.

FIG. 2 is a method flow chart of another embodiment of the microblog-based event context acquiring method according to an embodiment of the present invention, in which the method can be regarded as a specific implementing form of the embodiment shown in FIG. 1. On the basis of the embodiment shown in FIG. 1, this embodiment further illustrates a method for selecting the context time nodes of an initial event and a plurality of development events from the statistical time period and selecting the corresponding events according to these event context time nodes as the event context.

With reference to FIG. 2, in step S210, information of original microblogs and reposted microblogs thereof related to an event contained in a predetermined topic within a statistical time period is acquired. The process in step S210 is similar to the process in step S110.

Specifically, this embodiment specially makes statistics on the comment count, the repost count, and the praise count of the original microblogs and the reposted microblogs thereof from a variety of information of the original microblogs and the reposted microblogs thereof, which will be used in the subsequent process of calculating an event heat time distribution about the topic corresponding to the information of the original microblogs and the reposted microblogs thereof related to the event within the statistical time period.

On this basis, as a refinement of steps S120-S130, this embodiment determines the context time node of the initial event by making statistics on the generated first event heat time distribution about the topic within the statistical time period (corresponding to the steps including S220-S240); determines the context time nodes of the development event by making statistics on the generated second event heat time distribution about the topic after the context time node of the initial event within the statistical time period (corresponding to the steps including S250-S310); and determines the corresponding context time by determining the context time node of the initial event and the development event (corresponds to the steps including S320). Herein, the first event heat time distribution and the second event heat time distribution could be regarded as two specific forms about the event heat time distribution in the step S120. These steps are illustrated below in detail.

In step S220, a first event heat time distribution about the topic within the statistical time period is calculated according to the comment count, the repost count, and the praise count of all the original microblogs and reposted microblogs thereof related to the event contained in the topic; wherein the first event heat is a sum of event heat corresponding to all target events.

In order to determine the context time node of the initial event from the events contained in the topic within the statistical time period, this embodiment takes a sum of the event heat corresponding to the original microblogs and reposted microblogs thereof of all the target events about the topic as a statistical object, to form the first event heat. Optionally, in the process of forming the first event heat, the event heat corresponding to the original microblogs and the reposted microblogs thereof may be regarded to have the same weight.

Specifically, this embodiment shows a specific implementation of forming the first event heat time distribution, including the steps (a1-a3).

In a1, a weight coefficient is set for each of the comment count, the repost count, and the praise count of all the original microblogs and reposted microblogs thereof related to the event contained in the topic.

In a2, a sum of products obtained by multiplying each of the comment count, the repost count, and the praise count of all the newly generated original microblogs and reposted microblogs thereof related to the event corresponding to each time node within the statistical time period with the corresponding weight coefficient respectively is taken as the first event heat on the corresponding time node.

Specifically, through the statistics made on the newly generated comment count, repost count, and praise count of the original microblogs and the reposted microblogs thereof on each time node, the degree of concern of the users on the related event of the topic on the time node can be learned. Afterwards, a weighted sum of the comment count, the repost count, and the praise count can be calculated to learn a sum of one concerned event heat of the topic on each time node.

In a3, the first event heat time distribution is formed according to the first event heat corresponding to each time node within the statistical time period.

Figure 3:
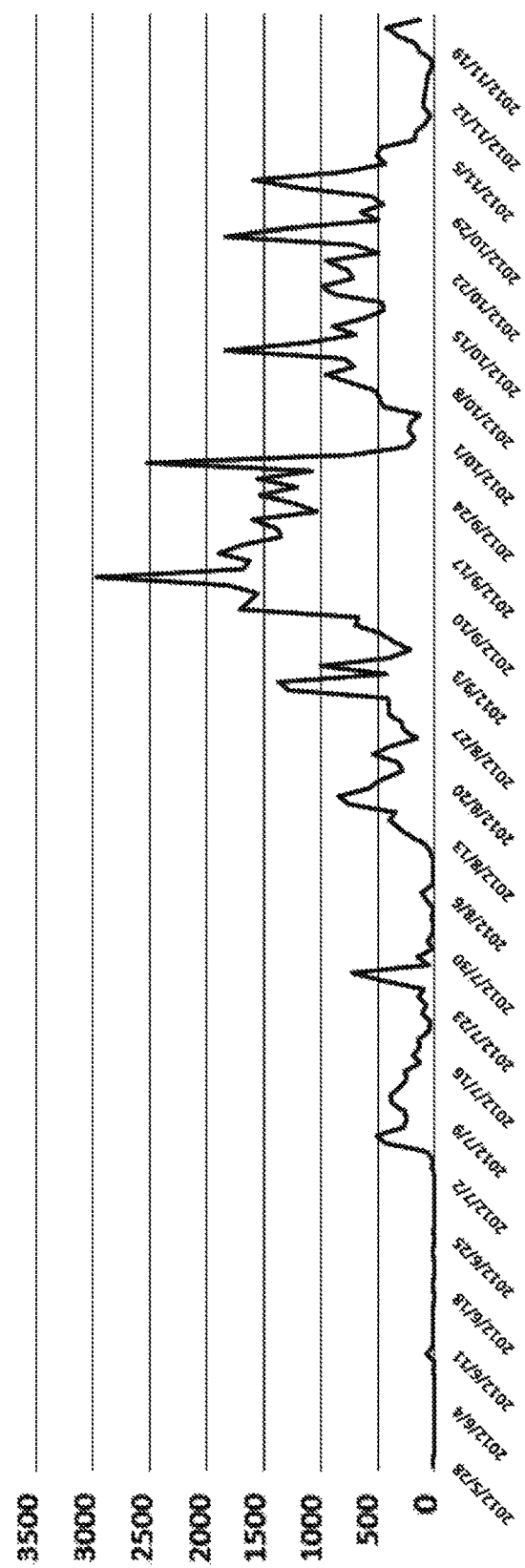
FIG. 3 is a schematic view of a first event heat time distribution of a topic of "Diaoyu Islands Dispute" according to an embodiment of the present invention.

As shown in Equation (1) and FIG. 3, this embodiment respectively shows the specific method of calculating the first event heat corresponding to each time node within the statistical time period and the schematic views of the first event heat time distribution about the topic "Diaoyu Islands Dispute" obtained by using the method.

$$\text{hot\_factor} = a*\log(\text{comment\_num}) + b*\log(\text{transimit\_num}) + c*\log(\text{praise\_num}) \quad (1)$$

wherein comment_num, transimit_num, and praise_num are the comment count, the repost count, and the praise count of the original microblogs or the reposted microblogs respectively; log( ) are logarithms calculated for the parameters within the parentheses; a, b, and c are weight coefficients corresponding to the comment count, the repost count, and the praise count respectively; and the hot_factor is the first time heat.

Accordingly, based on the above acquired first event heat time distribution, in this embodiment, with respect to the above step S130, the process of selecting a plurality of event context time nodes from the statistical time period in accordance with the event heat time distribution of the topic within the statistical time period includes: determining the context time node of the initial event according to the first event heat time distribution (corresponding to the steps of S230-S240).

In S230, a plurality of time nodes representing a steep increase of the first event heat in the first event heat time distribution is selected from the statistical time period according to the first event heat time distribution about the topic within the statistical time period.

In general, when a new event or an event progress is presented in the events contained in the topic, the users may pay a relatively concentrated attention on the original microblogs and the reposted microblogs thereof of the related event. The concentrated attention is reflected correspondingly, in the first event heat time distribution, as the occurrence of a steep increase of the heat in the first event heat which changes with time. By means of this feature, the time node where the steep increase of the heat occurs in the above first event heat time distribution is analyzed to determine the context time node of the initial event.

Specifically, when determining the time node representing the steep increase of the first event heat, the following method is used for implementation in this embodiment (corresponding to the steps including b1-b2).

In b1, with respect to the first event heat time distribution corresponding to the topic within the statistical time period, a calculation window that contains multiple time nodes is used to calculate a steep increase amount of the first event heat corresponding to each time node within the statistical time period by taking one time node as a slide window, so that a steep increase amount sequence of the first event heat is formed.

For example, one time node may be set as 1 day. Correspondingly, the steep increase amount of the first event heat corresponding to each time node within the statistical time period can be calculated by taking 3 days as a calculation window and 1 day as a slide window.

For example, when the calculation window is [t1, t2, t3], the steep increase amount of the first event heat corresponding to the $t2^{th}$ day can be obtained through the following equation:

$$\text{ratio}_2 = \frac{\text{hot\_factor}_{t2} - \text{hot\_factor}_{t1}}{\text{hot\_factor}_{t3} - \text{hot\_factor}_{t2}} \quad (2)$$

wherein the $\text{ratio}_2$ is the steep increase amount of the first event heat corresponding to the $2^{nd}$ day; and the $\text{hot\_factor}_{t1}$, $\text{hot\_factor}_{t2}$, and $\text{hot\_factor}_{t3}$ are the first event heat corresponding to the $t1^{th}$, $t2^{th}$, and $t3^{th}$ days respectively.

In b2, the time nodes corresponding to the first event heat that is greater than a first threshold value in the steep increase amount sequence of the first event heat are determined as the time nodes representing the steep increase of the first event heat.

The first threshold value is a parameter for measuring whether the steep increase amount of the first event heat can represent that the corresponding time node is the time node of the steep increase of the first event heat.

Specifically, the first threshold value can be obtained through the processing on the steep increase amount sequence of the first event heat by using Equations (3) and (4) to calculate an average value and a standard difference of the steep increase amount sequence of the first event heat, and configuring respective weight coefficients; and determining through Equation (5) a sum of products obtained by respectively multiplying the average value and the standard difference of the steep increase amount sequence of the first event heat with the corresponding weight coefficient as the first threshold value.

$$\text{avg\_ratio} = \frac{\sum_{i=1}^{n} \text{ratio}_i}{n} \quad (3)$$

$$\text{std\_ratio} = \sqrt{\frac{\sum_{i=1}^{n} (\text{ratio}_i - \text{avg\_ratio})^2}{n}} \quad (4)$$

$$\text{threshold} = \text{avg\_ratio} + \alpha * \text{std\_ratio} \quad (5)$$

wherein $\text{ratio}_i$ is the steep increase amount of the first event heat corresponding to the $i^{th}$ day; the avg_ratio and std_ratio are the average value and the standard difference of the steep increase amount sequence of the first event heat respectively; n is a length of the steep increase amount sequence of the first event heat; and $\alpha$ is the weight coefficient corresponding to the standard difference.

For example, in Equation (5), the weight coefficient of the average value of the steep increase amount sequence of the first event heat is set to 1, and the standard difference is set to a positive value less than 1.

In S240, the earliest time node among the time nodes representing the steep increase of the first event heat in the first event heat time distribution is determined as the context time node of the initial event.

On this basis, in order to determine the context time node of the development event from the events contained in the topic within the statistical time period, a weighted sum of the event heat corresponding to all the newly generated original microblogs and reposted microblogs thereof of the target events about the topic after the context time node of the initial event is taken as a statistical object, to form the second event heat. Optionally, in the process of forming the second event heat, the event heat corresponding to the original microblogs and the reposted microblogs thereof may be regarded to have the different weights.

Accordingly, in this embodiment, based on the above determined context time node of the initial event, the process of calculating the event heat time distribution about the topic corresponding to the information of the original microblogs and the reposted microblogs thereof related to the event within the statistical time period in the above step S120 further includes: calculating a second event heat time distribution about the topic within the statistical time period according to the comment count, the repost count, and the praise count of all the newly generated original microblogs and reposted microblogs thereof related to the event contained in the topic within the statistical time period after the context time node of the initial event; the second event heat being a weighted sum of the event heat after setting the weight coefficient respectively for the original microblogs and reposted microblogs thereof corresponding to all the target events (corresponding to the steps S250-S290).

In S250, a weight coefficient is set for each of the comment count, the repost count, and the praise count of all the newly generated original microblogs and reposted microblogs thereof related to the event contained in the topic within the statistical time period after the context time node of the initial event.

In S260, in all the newly generated original microblogs and reposted microblogs thereof related to the event contained in the topic within the statistical time period after the context time node of the initial event, the newly generated comment count, repost count, and praise count on each time node after the context time node of the initial event is multiplied with the weight coefficient respectively, and then values of the multiplying products corresponding to all the original microblogs are summed up to obtain the event heat of the original microblogs corresponding to the time node; and then values of the multiplying products corresponding to all the reposted microblogs are summed up to obtain the event heat of the reposted microblogs corresponding to the time node.

Specifically, based on the statistics made on the newly generated comment count, repost count, and praise count of the above target original microblogs and the reposted microblogs thereof on each time node, the degree of concern of the users on the related event after the context time node of the initial event of the topic on the time node can be learned. Afterwards, a weighted sum of the comment count, the repost count, and the praise count of the original microblogs and the reposted microblogs can be calculated separately on the basis of the properties of the original microblogs or the reposted microblogs, to learn a sum of two concerned event heat of the topic on each time node.

In S270, a corresponding weight coefficient is set respectively for the event heat of the original microblogs and the event heat of the reposted microblog;

Typically, the user who wants to get further knowledge on the topic of interest will tend to concern the information of the original microblogs of the events contained in the topic, to learn the earliest release situation of the related event. Based on such a factor, a corresponding weight coefficient is set respectively for the event heat of the original microblogs and the event heat of the reposted microblogs, to distinguish the concern weight of the two types of microblogs in the user group.

In S280, a sum of products obtained by multiplying the event heat of the original microblogs and the event heat of the reposted microblogs correspondingly provided on each time node after the context time node of the initial event with the corresponding weight coefficient respectively is taken as the second event heat on the corresponding time node.

Equations (6)-(9) sequentially give the equations for calculating the event heat of each original microblog and the reposted microblog thereof, the event heat of a weighted sum of each original microblog and the reposted microblog thereof, and a sum of the event heat (the second event heat) of the weighted sum of all the original microblogs and the reposted microblogs thereof.

$$\text{ori\_hot\_factor} = a*\log(\text{comment\_num}) + b*\log(\text{transimit\_num}) + c*\log(\text{praise\_num}) \qquad (6)$$

$$\text{transimit\_hot\_factor} = a*\log(\text{comment\_num}) + b*\log(\text{transimit\_num}) + c*\log(\text{praise\_num}) \qquad (7)$$

$$\text{hot\_factor}(\text{weibo}_i) = d_i * \text{ori\_hot\_factor}_i + \Sigma \text{transimit\_hot\_factor}_{ij} * e_i \qquad (8)$$

$$\text{hot\_factor}(\text{weibo}) = \Sigma \text{hot\_factor}(\text{weibo}_i) \qquad (9)$$

wherein ori_hot_ factor and transimit_ hot_ factor are the event heat of the original microblogs and the reposted microblogs respectively; $\text{ori\_hot\_factor}_i$, $\text{transimit\_hot\_factor}_{ij}$ and $\text{hot\_factor}(\text{weibo}_i)$ are the event heat of the $i^{th}$ original microblog and the $j^{th}$ reposted microblog from all the reposted microblogs thereof and a sum of the two heat (the heat of the $i^{th}$ microblog) respectively; $d_i$ and $e_i$ are the weight coefficients corresponding to the $i^{th}$ original microblog and all the reposted microblogs thereof respectively; hot_factor(weibo) is a sum of the event heat (the second event heat) of a weighted sum of all the original microblogs and reposted microblogs thereof; and i and j are integers greater than 0.

In S290, the second event heat time distribution is formed according to the second event heat corresponding to each time node after the context time node of the initial event within the statistical time period.

Accordingly, based on the above acquired second event heat time distribution, in this embodiment, with respect to the above step S130, the process of selecting a plurality of event context time nodes from the statistical time period in accordance with the event heat time distribution of the topic within the statistical time period includes: determining the context time nodes of the development event according to the second event heat time distribution (corresponding to the steps of S300-S310).

In S300, a plurality of time nodes representing generation of new events in the second event heat time distribution is selected from the statistical time period according to the second event heat time distribution about the topic within the statistical time period.

In general, when a new event or an event progress is presented in the events contained in the topic, the users may pay a relatively concentrated attention on the original microblogs and the reposted microblogs thereof of the related event. The concentrated attention is reflected correspondingly, in the second event heat time distribution, as the occurrence of a steep increase of the heat in the second event heat which changes with time. By means of this feature, the time node where the steep increase of the heat occurs in the above second event heat time distribution is analyzed, to determine the context time nodes of a plurality of development events.

Specifically, this embodiment illustrates a specific implementation of selecting a plurality of time nodes representing generation of new events according to the second event heat time distribution (corresponding to the steps including c1-c3).

In c1, statistics are made on the second event heat time distribution corresponding to the event contained in other topics (not the above mentioned topic) after the context time node of the initial event within the statistical time period.

In order to represent the change of the event heat of the microblogs caused by the generation of new events in the predetermined topic, this embodiment introduces the second event heat time distribution corresponding to the original microblogs and reposted microblogs thereof related to the event contained in the topics other than the predetermined topic as comparative information, to select out the time node representing that the new events are generated from the second event heat time distribution corresponding to the predetermined topic.

Herein, the calculation of the second event heat time distribution corresponding to the topics other than the predetermined topic within the same statistical time period is the same as that in the forgoing method, thus being not repeated in detail herein. The number of the topics other than the predetermined topic is not defined herein, and it is preferable to introduce the topics as much as possible.

In c2, with respect to the second event heat time distribution corresponding to the topic and the other topics, two adjacent calculation windows containing the same time node are used to calculate Chi-square statistics of a ratio of the second heat between the topic and the other topics corresponding to each two adjacent time nodes on the second event heat time distribution by taking one time node as a slide window, and the Chi-square statistic is taken as the Chi-square statistic corresponding to the first of the time nodes in the latter calculation window.

Here, we introduced a Chi-square method of hypothesis testing, which calculates for each event node the Chi-square statistic that can represent whether new events or progress events are generated with respect to the predetermined topic by comparing the sample parameters of two adjacent windows.

Figure 4:
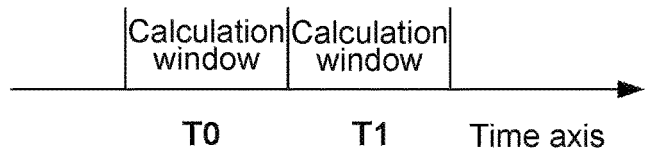
FIG. 4 is a sample chart of a Chi-square statistic for calculating a time node employing a calculation window as according to an embodiment of the present invention.

For example, in this embodiment, the corresponding Chi-square statistic on each time node is taken as a measurement value for judging whether new progress events happen with respect to the predetermined topic on the time node. Firstly, two adjacent calculation windows containing the same time node are selected, in the calculation window as shown in FIG. 4, the length of each calculation window may be 4 days (correspondingly containing 4 time nodes, each time node corresponding to 1 day), and 1 day is taken as the length of the slide window; the Chi-square statistic corresponding to each two calculation windows is constantly calculated on the time axis, and the amplitude value of the Chi-square statistic is given to the first time node in the latter calculation window. Thereby, whether each time node is an event progress point is evaluated by using the Chi-square statistic.

Specifically, as shown in FIG. 4, the method for calculating the Chi-square statistic corresponding to each two adjacent calculation windows is as follows:

If the two calculation windows are respectively T0 and T1, the corresponding second event heat of the predetermined topic and the non-predetermined topic (other topic) are as shown in Table 1. The second event heat of the predetermined topic and the non-predetermined topic in the two calculation windows are respectively extracted, to obtain a ratio of the two; through a Chi-square statistical method of hypothesis testing to judge whether the ratio has significant change on the corresponding time period of the two calculation windows. The significance of the change is taken as the Chi-square statistic representing that new events happen for the predetermined topic in this calculation window.

TABLE 1

Second heat distribution table of predetermined topic and non-predetermined topic

| Second event heat | T0 time period | T1 time period |
|---|---|---|
| Predetermined topic | $h_1$ | $h_2$ |
| Non-predetermined topic | $h_3$ | $h_4$ |

On the basis of the content shown in Table 1, the value of the Chi-square statistic Score (Q) within the corresponding time period in FIG. 4 may be obtained through Equation (10).

$$\text{Score }(Q) = \frac{N*(h_1 h_4 - h_2 h_3)^2}{(h_1 + h_3) \times (h_2 + h_4) \times (h_1 + h_2) \times (h_3 + h_4)} \quad (10)$$

where $N = h_1 + h_2 + h_3 + h_4$.

Finally, the obtained Score (Q) is taken as the Chi-square statistic corresponding to the first time node in the latter calculation window T1.

In c3, the time node corresponding to the Chi-square statistic greater than the second threshold value from the Chi-square statistics is determined as one of the time nodes representing generation of new events. The second threshold value is a parameter for measuring whether the Chi-square statistic can represent the corresponding time node is the time node on which the new events happen.

In S310, the time nodes representing generation of new events in the second event heat time distribution are determined as the context time nodes of a development event.

Based on the context time node of the initial event and the development event acquired in the above step, as a refinement of the step S130, selecting a corresponding event from the related events to constitute the event context of the topic includes (step S320):

In S320, a comprehensive score is evaluated on the event heat and microblog quality of the original microblogs of a newly added event contained in the topic corresponding to the acquired context time nodes of the initial event corresponding to the topic and the context time nodes of a plurality of development events, and the events of the original microblogs having the highest comprehensive score are selected as the node events corresponding to the context time nodes to constitute the event context of the topic.

For example, the comprehensive score may be evaluated on the event heat and the microblog quality of the original microblogs of the newly added event contained in the predetermined topic corresponding to the selected context time node through Equation (11).

$$\text{Score}(p) = f*\text{ori\_hot\_factor}(weibo_i) + g*\text{quality} \quad (11)$$

where Score (p) is the comprehensive score; ori_hot_factor($weibo_i$) is the event heat of the original microblogs of the target event; quality is the microblog quality corresponding to the original microblogs; and f and g are respectively the weight coefficients corresponding to the event heat and the microblog quality of the original microblogs.

Finally, the event corresponding to the original microblogs having the highest comprehensive score is taken as the node event corresponding to the context time node, so as to connect all the events on the context time node sequentially to constitute the event context of the topic.

Figure 5:
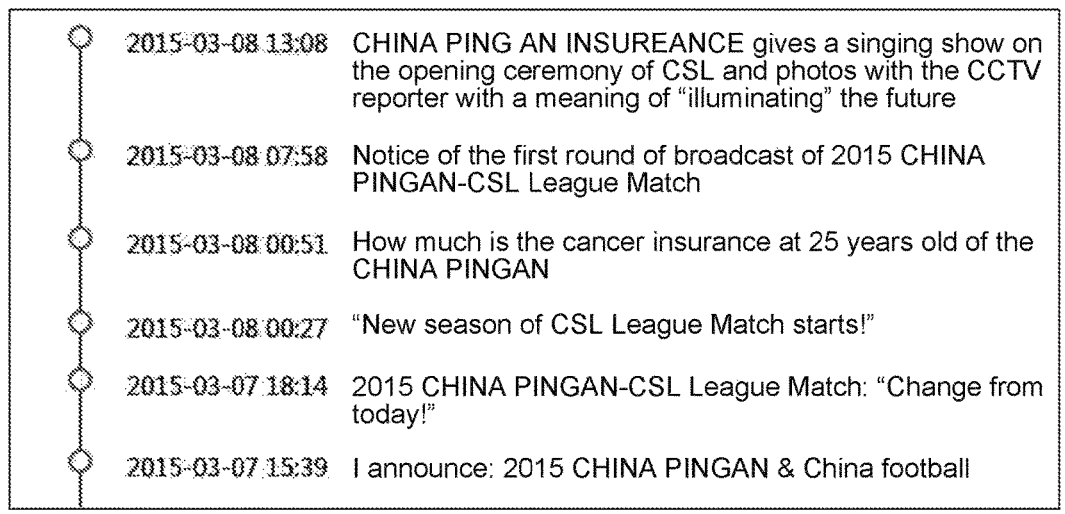
FIG. 5 is a sample chart of an event context of an event contained in a topic of "peace" according to an embodiment of the present invention.

FIG. 5 is a sample chart of an event context of an event contained in a topic of "peace" obtained by the method illustrated in the above embodiment provided in this embodiment.

Embodiments of the present invention provide a microblog-based event context acquiring method. On the basis of the embodiment shown in FIG. 1, the following steps are further illustrated: determining the context time node of the initial event of the predetermined topic by the formed first event heat time distribution; determining the context time node of the development event of the predetermined topic by the formed second event heat time distribution; and determining the node event on the corresponding time node through the determined context time nodes of the initial event and the development events, thereby obtaining the event context about the predetermined topic. The addition of these steps improves the accuracy of the event context of the finally determined topic event.

Embodiment 3

Figure 6:
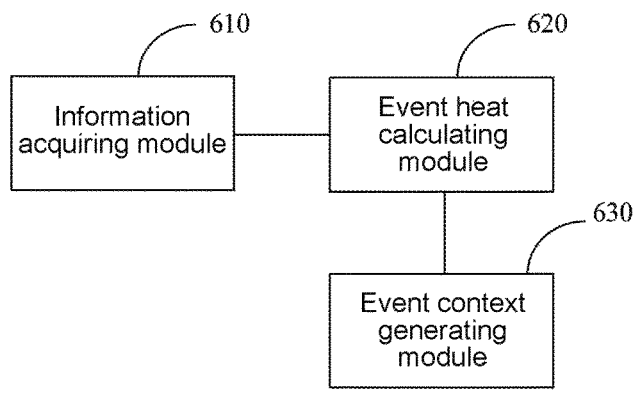
FIG. 6 is a schematic structural view of an embodiment of a microblog-based event context acquiring system according to an embodiment of the present invention.

FIG. 6 is a schematic structural view of an embodiment of a microblog-based event context acquiring system according to an embodiment of the present invention, and the system shown in FIG. 6 is used to execute the steps of the method of the embodiment shown in FIG. 1.

With reference to FIG. 6, the microblog-based event context acquiring system specifically includes an information acquiring module 610, an event heat calculating module 620, and an event context generating module 630.

The information acquiring module 610 is configured to acquire information of original microblogs and reposted microblogs thereof related to an event contained in a predetermined topic within a statistical time period. The event heat calculating module 620 is configured to calculate an event heat time distribution about the topic corresponding to the information of the original microblogs and the reposted microblogs thereof related to the event within the statistical time period, the event heat indicating a degree of concern of the original microblogs and the reposted microblogs thereof related to the event in a user group. The event context generating module 630 is configured to select, from the statistical time period, a plurality of event context time nodes and corresponding node events according to the event heat time distribution about the topic within the statistical time period so as to constitute an event context of the topic.

According to the microblog-based event context acquiring system provided in the embodiments of the present invention, the degrees of concern, in the user group, of the original microblogs and the reposted microblogs thereof related to the event contained in the predetermined topic are acquired by analysis to form the event heat time distribution about the topic, and then a plurality of event context time node and corresponding node events are selected to constitute the event context about the topic by using the distribution characteristics of the event heat time distribution. The system in this embodiment can acquire the event context of the predetermined topic within the statistical time period quickly and accurately.

Embodiment 4

Figure 7:
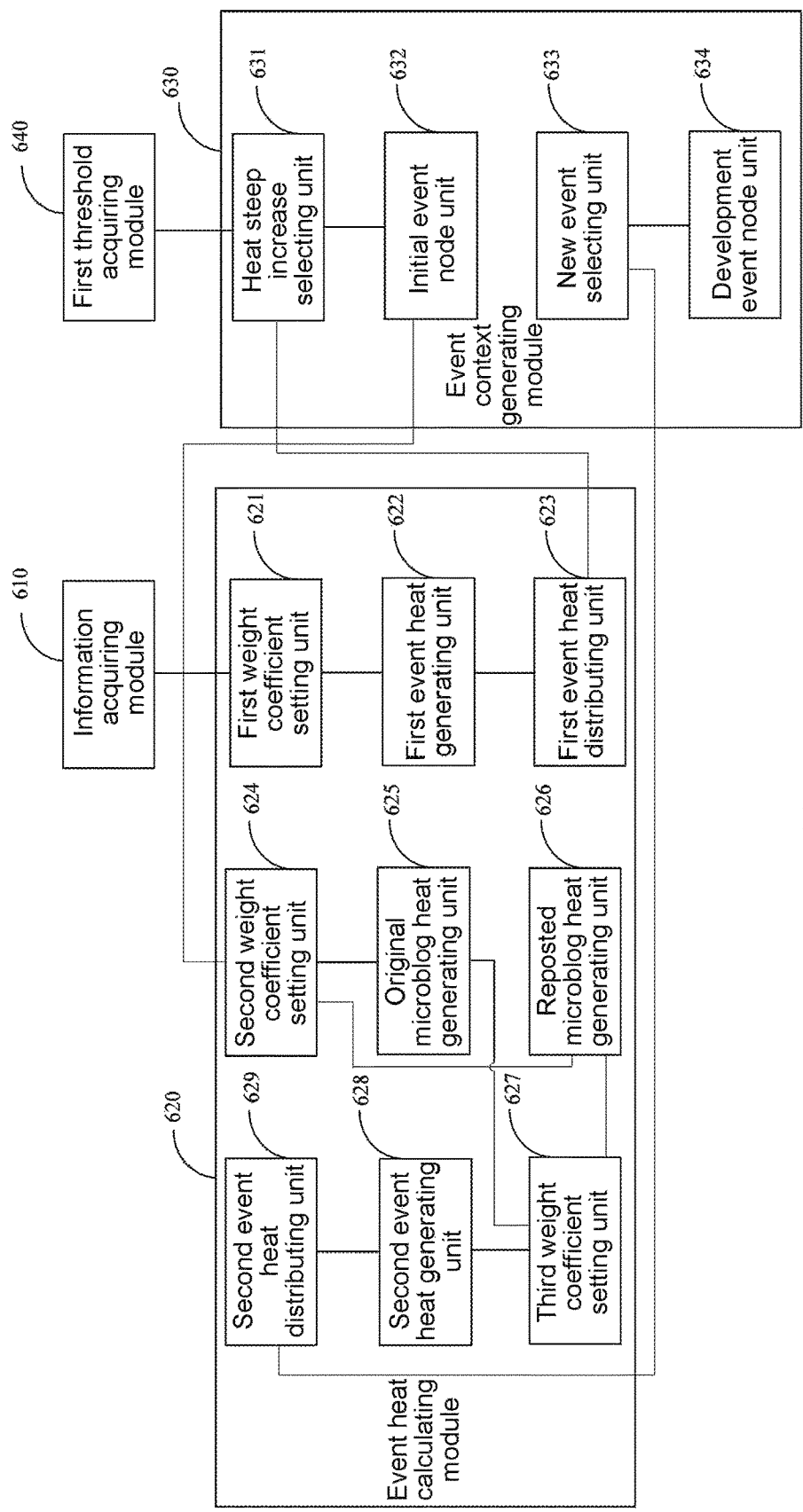
FIG. 7 is a schematic structural view of another embodiment of a microblog-based event context acquiring system according to an embodiment of the present invention.

FIG. 7 is a schematic structural view of an embodiment of a microblog-based event context acquiring system according to an embodiment of the present invention, which can be regarded as a specific implementing structure of the embodiment shown in FIG. 6, for executing the steps of the method of the embodiment shown in FIG. 2.

With reference to FIG. 7, the microblog-based event context acquiring system includes an information acquiring module 610, an event heat calculating module 620, and an event context generating module 630, which are substantially the same as the corresponding modules in FIG. 6.

Further, the information of the original microblogs and the reposted microblogs thereof includes: a comment count, a repost count, and a praise count of the original microblogs and the reposted microblogs thereof.

On this basis, in the system shown in FIG. 7, the event heat calculating module 620 is further configured to calculate a first event heat time distribution about the topic within the statistical time period according to the comment count, the repost count, and the praise count of all the original microblogs and reposted microblogs thereof related to the event contained in the topic, the first event heat being a sum of the event heat corresponding to all target events.

Further, the above event heat calculating module 620 includes: a first weight coefficient setting unit 621, configured to set a weight coefficient for each of the comment count, the repost count, and the praise count of all the original microblogs and reposted microblogs thereof related to the event contained in the topic; a first event heat generating unit 622, configured to sum up products obtained by multiplying each of the comment count, the repost count, and the praise count of all newly generated original microblogs and reposted microblogs thereof related to the event corresponding to each time node within the statistical time period with respective weight coefficient as the first event heat on the corresponding time node; and a first event heat distributing unit 623, configured to form the first event heat time distribution according to the first event heat corresponding to each time node within the statistical time period.

On this basis, correspondingly, the above event context generating module 630 may include: a heat steep increase selecting unit 631, configured to select, from the statistical time period, a plurality of time nodes representing a steep increase of the first event heat in the first event heat time distribution according to the first event heat time distribution about the topic within the statistical time period; and an initial event node unit 632, configured to determine an earliest time node from the time nodes representing the steep increase of the first event heat in the first event heat time distribution as a context time node of an initial event.

Further, the above heat steep increase selecting unit 631 is configured to: calculate, for the first event heat time distribution corresponding to the topic within the statistical time period, a steep increase amount of the first event heat corresponding to each time node within the statistical time period by using a calculation window containing multiple time nodes and taking one time node as a slide window to form a steep increase amount sequence of the first event heat; and determine the time nodes corresponding to the first event heat that is greater than a first threshold value in the steep increase amount sequence of the first event heat as the time nodes representing the steep increase of the first event heat.

Further, the system shown in FIG. 7 further includes a first threshold value acquiring module 640, configured to: calculate an average value and a standard difference of the steep increase amount sequence of the first event heat, and configure corresponding weight coefficients thereof; and determine a sum of products obtained by multiplying the average value and the standard difference of the steep increase amount sequence of the first event heat with respective weight coefficient as the first threshold value.

On this basis, the event heat calculating module 620 may be further configured to: calculate a second event heat time distribution about the topic within the statistical time period according to the comment count, the repost count, and the praise count of all the original microblogs and reposted microblogs thereof, after the context time node of the initial event, related to the event contained in the topic within the statistical time period, the second event heat being a weighted sum of the event heat after weight coefficients are set for the original microblogs and reposted microblogs thereof corresponding to all the target events respectively.

Further, the above event heat calculating module 620 may further include: a second weight coefficient setting unit 624, configured to set a weight coefficient for each of the comment count, the repost count, and the praise count of all the newly generated original microblogs and reposted microblogs thereof, after the context time node of the initial event, related to the event contained in the topic within the statistical time period; an original microblog heat generating unit 625, configured to, for all original microblogs generated after the context time node of the initial event related to the event contained in the topic within the statistical time period, multiply the comment count, repost count, and praise count generated on each time node after the context time node of the initial event with respective weight coefficient, and then summing up the multiplying products corresponding to all the original microblogs to obtain the event heat of the original microblogs corresponding to the time node; and a reposted microblog heat generating unit 626, configured to, for all reposted microblogs of the original microblogs generated after the context time node of the initial event related to the event contained in the topic within the statistical time period, multiply the comment count, repost count, and praise count generated on each time node after the context time node of the initial event with respective weight coefficient, and then summing up the multiplying products corresponding to all the reposted microblogs to obtain the event heat of the reposted microblogs corresponding to the time node; a third weight coefficient setting unit 627, configured to set a corresponding weight coefficient for the event heat of the original microblogs and the event heat of the reposted microblogs respectively; a second event heat generating unit 628, configured to sum up products obtained by multiplying the event heat of the original microblogs and the event heat of the reposted microblogs corresponding to each time node after the context time node of the initial event with respective weight coefficient as the second event heat on the corresponding time node; and a second event heat distributing unit 629, configured to form the second event heat time distribution according to the second event heat corresponding to each time node after the context time node of the initial event within the statistical time period.

On this basis, the above event context generating module may further include: a new event selecting unit 633, configured to select, from the statistical time period, a plurality of time nodes representing generation of new events in the second event heat time distribution according to the second event heat time distribution about the topic within the statistical time period; and a development event node unit 634, configured to determine the time nodes representing generation of new events in the second event heat time distribution as the context time nodes of a development event.

Further, the above new event selecting unit 633 is further configured to: make statistics on the second event heat time distribution corresponding to events contained in another topic after the context time node of the initial event within the statistical time period; for the second event heat time distributions corresponding to the topic and another topic, calculate Chi-square statistics of a ratio of the second heat between the topic and the another topic corresponding to each two adjacent time nodes on the second event heat time distribution by using two adjacent calculation windows containing the same time node and taking one time node as the slide window, as the Chi-square statistic corresponding to the first time node of the time nodes in the latter calculation window; and determine the time node corresponding to the Chi-square statistic greater than a second threshold value from the Chi-square statistics as one of the time nodes representing generation of new events.

Further, the above event context generating module 630 is further configured to: evaluate a comprehensive score on the event heat and microblog quality of the original microblogs related to a newly added event contained in the topic corresponding to the acquired context time node of the initial event and the context time nodes of a plurality of development events corresponding to the topic, and select the event corresponding to the original microblog having the highest comprehensive score as a node event corresponding to the corresponding context time node.

Embodiments of the present invention provide a microblog-based event context acquiring system. On the basis of the system embodiment shown in FIG. 6, the following steps are further illustrated: determining the context time node of the initial event of the predetermined topic through the formed first event heat time distribution; determining the context time node of the development event of the predetermined topic through the formed second event heat time distribution; and determining the node event on the corresponding time node through the determined context time nodes of the initial event and the development events, thereby obtaining the event context about the predetermined topic. The addition of these steps improves the accuracy of the event context of the finally determined topic event.

The above method and device according to an embodiment of the present invention can be implemented in hardware or firmware, or implemented as software or computer codes that can be stored in a recording medium (such as CD, ROM, RAM, floppy disk, hard disk, or magnetic CD), or implemented as computer codes originally stored in a remote recording medium or a non-temporarily machine readable medium, downloaded through the network and will be stored in a local recording medium. Therefore, the method described herein can be processed by such software stored on the recording medium using a general-purpose computer, a dedicated processor, or programmable or dedicated hardware (such as an ASIC or FPGA). It can be understood that, the computer, processor, microprocessor controller, or programmable hardware includes storage components (for example, RAM, ROM, Flash memory, and the like) capable of storing or receiving the software or computer codes. When the software or computer codes are accessed and executed by the computers, processors, or hardware, the processing method described herein is fulfilled. In addition, when the general-purpose computer make access to the codes for implementing the process described herein, the execution of the codes converts the general-purpose computer into the dedicated computer used to execute the process described herein.

The above description is merely a specific implementation manner of the present invention, but is not intended to limit to the protection scope of the invention, and any one skilled in the art can easily think of changes or replacements within the technical scope disclosed in the present invention, which shall all fall within the protection scope of the invention. Therefore, the protection scope of the present invention should conform to the scope of protection scope of the claims.

What is claimed is:

1. A microblog-based event context acquiring method, comprising:

acquiring information of original microblogs and reposted microblogs thereof related to an event contained in a predetermined topic within a statistical time period, the information of the original microblogs and the reposted microblogs thereof comprising: a comment count, a repost count, and a praise count;

calculating an event heat time distribution about the topic corresponding to the information of the original microblogs and the reposted microblogs thereof related to the event within the statistical time period, the event heat indicating a degree of concern of the original microblogs and the reposted microblogs thereof related to the event in a user group; and selecting, from the statistical time period, a plurality of event context time nodes and corresponding node events according to the event heat time distribution about the topic within the statistical time period so as to constitute an event context of the topic, wherein calculating the event heat time distribution about the topic corresponding to the information of the original microblogs and the reposted microblogs thereof related to the event within the statistical time period comprises:

calculating a first event heat time distribution about the topic within the statistical time period according to the comment count, the repost count, and the praise count of all the original microblogs and reposted microblogs thereof related to the event contained in the topic, the first event heat being a sum of the event heat corresponding to all target events.

2. The method of claim 1, wherein calculating the first event heat time distribution about the topic within the statistical time period according to the comment count, the repost count, and the praise count of all the original microblogs and reposted microblogs thereof related to the event contained in the topic comprises:
   setting a weight coefficient for each of the comment count, the repost count, and the praise count of all the original microblogs and reposted microblogs thereof related to the event contained in the topic;
   summing up products obtained by multiplying each of the comment count, the repost count, and the praise count of all newly generated original microblogs and reposted microblogs thereof related to the event corresponding to each time node within the statistical time period with respective weight coefficient as the first event heat on the corresponding time node; and
   forming the first event heat time distribution according to the first event heat corresponding to each time node within the statistical time period.

3. The method of claim 2, wherein selecting, from the statistical time period, a plurality of event context time nodes according to the event heat time distribution about the topic within the statistical time period comprises:
   selecting, from the statistical time period, a plurality of time nodes representing a steep increase of the first event heat in the first event heat time distribution according to the first event heat time distribution about the topic within the statistical time period; and
   determining an earliest time node from the time nodes representing the steep increase of the first event heat in the first event heat time distribution as a context time node of an initial event.

4. The method of claim 3, wherein selecting, from the statistical time period, a plurality of time nodes representing a steep increase of the first event heat in the first event heat time distribution according to the first event heat time distribution about the topic within the statistical time period comprises:
   calculating, for the first event heat time distribution corresponding to the topic within the statistical time period, a steep increase amount of the first event heat corresponding to each time node within the statistical time period by using a calculation window containing multiple time nodes and taking one time node as a slide window to form a steep increase amount sequence of the first event heat; and
   determining the time nodes corresponding to the first event heat that is greater than a first threshold value in the steep increase amount sequence of the first event heat as the time nodes representing the steep increase of the first event heat.

5. The method of claim 4, wherein the first threshold value is obtained by:
   calculating an average value and a standard difference of the steep increase amount sequence of the first event heat, and configuring corresponding weight coefficients thereof; and
   determining a sum of products obtained by multiplying the average value and the standard difference of the steep increase amount sequence of the first event heat with respective weight coefficient as the first threshold value.

6. The method of claim 3, wherein calculating the event heat time distribution about the topic corresponding to the information of the original microblogs and the reposted microblogs thereof related to the event within the statistical time period comprises calculating a second event heat time distribution about the topic within the statistical time period according to the comment count, the repost count, and the praise count of all the original microblogs and reposted microblogs thereof, after the context time node of the initial event, related to the event contained in the topic within the statistical time period, the second event heat being a weighted sum of the event heat after weight coefficients are set for the original microblogs and reposted microblogs thereof corresponding to all the target events respectively.

7. The method of claim 6, wherein calculating the second event heat time distribution about the topic within the statistical time period according to the comment count, the repost count, and the praise count of all the original microblogs and reposted microblogs thereof, after the context time node of the initial event, related to the event contained in the topic within the statistical time period comprises:
   setting a weight coefficient for each of the comment count, the repost count, and the praise count of all the newly generated original microblogs and reposted microblogs thereof, after the context time node of the initial event, related to the event contained in the topic within the statistical time period;
   for all original microblogs generated after the context time node of the initial event and reposted microblogs thereof related to the event contained in the topic within the statistical time period, multiplying the comment count, repost count, and praise count generated on each time node after the context time node of the initial event with respective weight coefficient, summing up the multiplying products corresponding to all the original microblogs to obtain the event heat of the original microblogs corresponding to the time node, and summing up the multiplying products corresponding to all the reposted microblogs to obtain the event heat of the reposted microblogs corresponding to the time node;
   setting a corresponding weight coefficient for the event heat of the original microblogs and the event heat of the reposted microblogs respectively;
   summing up the products obtained by multiplying the event heat of the original microblogs and the event heat of the reposted microblogs corresponding to each time node after the context time node of the initial event with respective weight coefficient as the second event heat on the corresponding time node; and
   forming the second event heat time distribution according to the second event heat corresponding to each time node after the context time node of the initial event within the statistical time period.

8. The method of claim 7, wherein selecting, from the statistical time period, the plurality of event context time nodes according to the event heat time distribution about the topic within the statistical time period comprises:
   selecting, from the statistical time period, a plurality of time nodes representing generation of new events in the second event heat time distribution according to the second event heat time distribution about the topic within the statistical time period; and determining the time nodes representing generation of new events in the second event heat time distribution as the context time nodes of a development event.

9. The method of claim 8, wherein selecting, from the statistical time period, the plurality of time nodes representing generation of new events in the second event heat time distribution according to the second event heat time distribution about the topic within the statistical time period comprises:

making statistics on the second event heat time distribution corresponding to events contained in another topic after the context time node of the initial event within the statistical time period;

for the second event heat time distributions corresponding to the topic and another topic, calculating Chi-square statistics of a ratio of the second heat between the topic and the another topic corresponding to each two adjacent time nodes on the second event heat time distribution by using two adjacent calculation windows containing the same time node and taking one time node as the slide window, as the Chi-square statistic corresponding to the first time node of the time nodes in the latter calculation window; and determining the time node corresponding to the Chi-square statistic greater than a second threshold value from the Chi-square statistics as one of the time nodes representing generation of new events.

10. The method of claim 8, wherein selecting, from the statistical time period, the events corresponding to the plurality of event context time nodes according to the event heat time distribution about the topic within the statistical time period comprises:

evaluating a comprehensive score on the event heat and microblog quality of the original microblogs related to a newly added event contained in the topic corresponding to the acquired context time node of the initial event and the context time nodes of a plurality of development events corresponding to the topic, and selecting the event corresponding to the original microblog having the highest comprehensive score as a node event corresponding to the corresponding context time node.

11. A microblog-based event context acquiring system, comprising:

a processor; and a memory storing computer-readable instructions;

wherein, when the computer-readable instructions are executed by the processor, the processor is configured to:

acquire information of original microblogs and reposted microblogs thereof related to an event contained in a predetermined topic within a statistical time period, the information of the original microblogs and the reposted microblogs thereof comprising: a comment count, a repost count, and a praise count;

calculate an event heat time distribution about the topic corresponding to the information of the original microblogs and the reposted microblogs thereof related to the event within the statistical time period, the event heat indicating a degree of concern of the original microblogs and the reposted microblogs thereof related to the event in a user group;

calculate a first event heat time distribution about the topic within the statistical time period according to the comment count, the repost count, and the praise count of all the original microblogs and reposted microblogs thereof related to the event contained in the topic, the first event heat being a sum of the event heat corresponding to all target events; and select, from the statistical time period, a plurality of event context time nodes and corresponding node events according to the event heat time distribution about the topic within the statistical time period so as to constitute an event context of the topic.

12. The system of claim 11, wherein the processor is configured to calculate the event heat time distribution by:

setting a weight coefficient for each of the comment count, the repost count, and the praise count of all the original microblogs and reposted microblogs thereof related to the event contained in the topic;

summing up products obtained by multiplying each of the comment count, the repost count, and the praise count of all newly generated original microblogs and reposted microblogs thereof related to the event corresponding to each time node within the statistical time period with respective weight coefficient as the first event heat on the corresponding time node; and forming the first event heat time distribution according to the first event heat corresponding to each time node within the statistical time period.

13. The system of claim 12, wherein the processor is configured to constitute the event context of the topic by:

selecting, from the statistical time period, a plurality of time nodes representing a steep increase of the first event heat in the first event heat time distribution according to the first event heat time distribution about the topic within the statistical time period; and determining an earliest time node from the time nodes representing the steep increase of the first event heat in the first event heat time distribution as a context time node of an initial event.

14. The system of claim 13, wherein the processor is configured to:

calculate, for the first event heat time distribution corresponding to the topic within the statistical time period, a steep increase amount of the first event heat corresponding to each time node within the statistical time period by using a calculation window containing multiple time nodes and taking one time node as a slide window to form a steep increase amount sequence of the first event heat; and determine the time nodes corresponding to the first event heat that is greater than a first threshold value in the steep increase amount sequence of the first event heat as the time nodes representing the steep increase of the first event heat.

15. The system of claim 14, wherein the processor is further configured to:

calculate an average value and a standard difference of the steep increase amount sequence of the first event heat, and configure corresponding weight coefficients thereof; and determine a sum of products obtained by multiplying the average value and the standard difference of the steep increase amount sequence of the first event heat with respective weight coefficient as the first threshold value.

16. The system of claim 13, wherein the processor is further configured to calculate a second event heat time distribution about the topic within the statistical time period according to the comment count, the repost count, and the praise count of all the original microblogs and reposted microblogs thereof, after the context time node of the initial event, related to the event contained in the topic within the statistical time period, the second event heat being a weighted sum of the event heat after weight coefficients are set for the original microblogs and reposted microblogs thereof corresponding to all the target events respectively.

17. The system of claim 16, wherein the processor is further configured to:
  set a weight coefficient for each of the comment count, the repost count, and the praise count of all the newly generated original microblogs and reposted microblogs thereof, after the context time node of the initial event, related to the event contained in the topic within the statistical time period;
  for all original microblogs generated after the context time node of the initial event related to the event contained in the topic within the statistical time period, multiply the comment count, repost count, and praise count generated on each time node after the context time node of the initial event with respective weight coefficient, and then summing up the multiplying products corresponding to all the original microblogs to obtain the event heat of the original microblogs corresponding to the time node;
  for all reposted microblogs of the original microblogs generated after the context time node of the initial event related to the event contained in the topic within the statistical time period, multiply the comment count, repost count, and praise count generated on each time node after the context time node of the initial event with respective weight coefficient, and then summing up the multiplying products corresponding to all the reposted microblogs to obtain the event heat of the reposted microblogs corresponding to the time node;
  set a corresponding weight coefficient for the event heat of the original microblogs and the event heat of the reposted microblogs respectively;
  sum up products obtained by multiplying the event heat of the original microblogs and the event heat of the reposted microblogs corresponding to each time node after the context time node of the initial event with respective weight coefficient as the second event heat on the corresponding time node; and
  form the second event heat time distribution according to the second event heat corresponding to each time node after the context time node of the initial event within the statistical time period.

18. The system of claim 17, wherein the processor is further configured to:
  select, from the statistical time period, a plurality of time nodes representing generation of new events in the second event heat time distribution according to the second event heat time distribution about the topic within the statistical time period; and
  determine the time nodes representing generation of new events in the second event heat time distribution as the context time nodes of a development event.

19. The system of claim 18, wherein the processor is further configured to:
  make statistics on the second event heat time distribution corresponding to events contained in another topic after the context time node of the initial event within the statistical time period;
  for the second event heat time distributions corresponding to the topic and another topic, calculate Chi-square statistics of a ratio of the second heat between the topic and the another topic corresponding to each two adjacent time nodes on the second event heat time distribution by using two adjacent calculation windows containing the same time node and taking one time node as the slide window, as the Chi-square statistic corresponding to the first time node of the time nodes in the latter calculation window; and
  determine the time node corresponding to the Chi-square statistic greater than a second threshold value from the Chi-square statistics as one of the time nodes representing generation of new events.

20. The system of claim 18, wherein the processor is further configured to:
  evaluate a comprehensive score on the event heat and microblog quality of the original microblogs related to a newly added event contained in the topic corresponding to the acquired context time node of the initial event and the context time nodes of a plurality of development events corresponding to the topic, and select the event corresponding to the original microblog having the highest comprehensive score as a node event corresponding to the corresponding context time node.

21. A non-transitory computer storing medium storing computer-readable instructions, wherein, when the computer-readable instructions are executed by a processor, the processor is configured to:
  acquire information of original microblogs and reposted microblogs thereof related to an event contained in a predetermined topic within a statistical time period, the information of the original microblogs and the reposted microblogs thereof comprising: a comment count, a repost count, and a praise count;
  calculate an event heat time distribution about the topic corresponding to the information of the original microblogs and the reposted microblogs thereof related to the event within the statistical time period, the event heat indicating a degree of concern of the original microblogs and the reposted microblogs thereof related to the event in a user group;
  calculate a first event heat time distribution about the topic within the statistical time period according to the comment count, the repost count, and the praise count of all the original microblogs and reposted microblogs thereof related to the event contained in the topic, the first event heat being a sum of the event heat corresponding to all target events; and
  select, from the statistical time period, a plurality of event context time nodes and corresponding node events according to the event heat time distribution about the topic within the statistical time period so as to constitute an event context of the topic.

\* \* \* \* \*